United States Patent [19]

Park

[11] Patent Number: 5,631,763
[45] Date of Patent: May 20, 1997

[54] Fθ LENS SYSTEM IN A LASER SCANNING UNIT

[75] Inventor: Chang J. Park, Kyunggi-Do, Rep. of Korea

[73] Assignee: Samsung Electro-Mechanics Co., Ltd., Kyunggi-do, Rep. of Korea

[21] Appl. No.: 520,691

[22] Filed: Aug. 30, 1995

[30] Foreign Application Priority Data

Aug. 30, 1994 [KR] Rep. of Korea ............... P 94-21471

[51] Int. Cl.$^6$ ............................................. G02B 26/08
[52] U.S. Cl. ................ 359/206; 359/207; 359/216; 359/217; 359/662; 359/710; 359/711; 359/717; 359/793
[58] Field of Search ........................... 359/206–207, 359/205, 216–219, 662, 710–711, 717, 793, 794; 347/258–261

[56] References Cited

U.S. PATENT DOCUMENTS

| Re. 34,438 | 11/1993 | Yamakawa | 359/206 |
| 4,818,046 | 4/1989 | Kondo | 359/206 |
| 5,136,418 | 8/1992 | Itabashi | 359/218 |

*Primary Examiner*—James Phan
*Attorney, Agent, or Firm*—Lowe, Price, LeBlanc & Becker

[57] ABSTRACT

An fθ lens system employing two fθ lenses in a laser scanning unit. According to the fθ lens system, a cheap plastic can be used for an fθ lens by lowering the refractive index of one of two fθ lenses and forming a toric face on one of total four refractive faces. Incident and emergent faces in the cross scan direction of a first fθ lens closer to a rotary polygon mirror has the curvature of ∞, and an incident face in the main scan direction of a second fθ lens closer to a photoconductive drum also has the curvature of ∞. Thus, only an emergent face of the second fθ lens has a toric face.

4 Claims, 3 Drawing Sheets

Fθ LENS SYSTEM IN A LASER SCANNING UNIT

BACKGROUND OF THE INVENTION

1. Field of the Invention

The present invention relates to an fθ lens system built in a laser scanning unit employing a rotary polygon mirror.

2. Description of the Related Art

A laser scanning unit for scanning image data onto a photoconductive scanned face is widely used as a primary component in a laser beam printer, facsimile, digital copier, etc. The term, laser scanning unit, will be referred to as "LSU" throughout this specification.

FIG. 1A simply shows the conceptual structure of a LSU. To scan image data from an image processor onto a photoconductive drum 3, the LSU employs a laser source 1 and a rotary polygon mirror 2. Generally, a semiconductor laser diode is used as the laser source 1 and the photoconductive materials are coated on the surface of a cylindrical drum to form a photoconductive drum 3.

Polygon mirror 2 is usually forms a square, hexagon, or an octagon, of which the reflecting faces must be polished into extremely high flatness to reduce image deterioration.

Being turned on or off according to binary levels of image data, the laser source 1 emanates a laser beam onto the reflecting face of the polygon mirror 2. Since the polygon mirror 2 rotates, the laser beam is deflected from the reflecting face and is thereafter line scanned in a dot shape onto the photoconductive drum 3. The laser beam changes its scanning line along the respective reflecting faces of the polygon mirror. This can be done by rotating the photoconductive drum 3 at a regular speed. Like the above, scanning a laser beam in the axial direction of a photoconductive drum by rotating a polygon mirror is called "main scanning"; changing scanning lines in the direction perpendicular to the main scan by rotating the photoconductive drum is called "cross scanning".

However, a problem arises in such a structure: Since the distance between the central part of a scanned face (i.e., the photoconductive drum) and the reflecting face differs from that between the end parts of the scanned face and the reflecting face, the laser beam cannot be uniformly focused along the entire scanned face. This causes severe damage to image replica appliances for which the picture quality is a most important factor.

To avoid the above problem, several correction lenses 4 and 5 are placed between the polygon mirror 2 and the photoconductive drum 3, as depicted in FIG. 1B. This correction lens is often called an fθ lens, expressing mathematically its focal length correcting function. The fθ lenses 4 and 5 must correct, as shown in FIGS. 1B and 1C, beam spots not only in the main scan direction but also in the cross scan direction, to perform complete dot correction (correction into an ellipse whose axis in the cross scan direction is slightly longer than that in the main scan direction).

Thus the fθ lenses 4 and 5 must be designed such that each of the refractive faces has a given radius of curvature in the cross scan direction as well as in the main scan direction. Of course, the two radius values have different values. Such a lens is called a toric face lens.

FIGS. 1B and 1C show a practical LSU structure, in which the conceptual LSU in FIG. 1A is completed by several ancillary components. A monochromatic laser beam (usually 780-nm wavelength) emitted from laser diode 1 is modulated into a parallel beam through a collimation lens 6, and the modulated laser beam is incident on the reflecting face of the polygon mirror 2. The beam is deflected by the reflecting face rotating at a high speed in conjunction with the polygon mirror 2 and is thereafter line scanned in the main scan direction onto the photoconductive drum 3. Because of this deflection function, a rotary polygon mirror is sometimes called "deflector". At this point, the fθ lenses 4 and 5 properly corrects the focal length differences in the beam to scan the beam uniformly onto the photoconductive drum 3 at an equal velocity and a regular linearity, thereby forming equal beam spots on the drum 3.

A beam detector 7 and a plane mirror 8 are provided to line up the starting and ending points of each scanning line at both scanned limits of the photoconductive drum 3. The plane mirror 8 is installed above one end of the photoconductive drum 3, facing the beam detector 7 with a given angle. This angle must be set to reflect the laser beam exactly towards the beam detector 7 when the laser beam is incident on the mirror 8. The reflected beam is then transformed into an electrical signal by the beam detector 7 and the related circuits (not shown), and is provided as a pulse signal to a controller (this pulse signal is usually called a synchronous signal).

In practice, the deflected laser beam is reflected on a narrow and long plane mirror 9 to be scanned onto the photoconductive drum 3, so that the mechanical distance from the polygon mirror 2 (i.e., the deflector) to the drum 3 (i.e., the scanned face) is reduced and the beam running direction is changed. The plane mirror 9 changes only the beam running direction, not beam characteristics. The reflecting angle of the mirror 9 can be modified according to designer discretion. By doing so, the mechanical dimension of the LSU, and thus an assembled final product, can be reduced, and the design job becomes easier.

U.S. Pat. No. 5,136,418 discloses one of the LSUs employing toric face lenses in a lens system which corrects a scanned image, using two fθ lenses. In the '418 patent, two of the four refractive faces, i.e., the front and rear of the two fθ lenses, are the toric faces.

In fabricating a lens, since it is quite difficult to process a toric face which has various radii of curvature in the every direction and the permissible tolerance range is narrow (typically 2/100–5/100 mm), this type of lens is not suitable for mass production. Thus the possibility of inferior quality LSUs in process, and therefore the total costs, increase.

Conventional LSUs commonly include a group of several fθ lenses having two or more toric faces. Because of many toric faces, the yield of the LSUs decreases and the costs increase, for the above reasons. In addition, since the refractive index of a lens must be relatively larger, high refractivity materials must be used for the lens.

SUMMARY OF THE INVENTION

It is one object of this invention to provide an fθ lens system in which an easily processed cheap plastic material is used, in the designing of a LSU having two fθ lenses whose refractive indices differ from each other, used for one of the two fθ lenses whose refractive index is lower than the other.

It is another object of this invention to provide an fθ lens system which has only one toric face to allow for easier fabrication of a lens.

To achieve the above objects, there is provided an fθ lens system in a laser scanning unit having a laser source for emanating a laser beam, a rotary deflector for deflecting the laser beam in the horizontal main scan direction, a scanned face on which the laser beam deflected from the rotary deflector is scanned, the scanned face being rotated such that the laser beam is scanned thereon in the cross scan direction perpendicular to the main scan direction, and a group of two fθ lenses, which are positioned between the rotary deflector and the scanned face, for focusing uniformly the laser beam deflected from the rotary deflector on the scanned face. The group of two fθ lenses comprises a first fθ lens and a second fθ lens sequentially arranged from the deflector towards the scanned face, wherein a refractive index of the first fθ lens is lower than that of the second fθ lens. Incident and emergent faces of the first fθ lens and an incident face of the second fθ lens are shaped into a cylindrical face, and an emergent face of the second fθ lens is shaped into a toric face.

DESCRIPTION OF THE DRAWINGS

Further objects and advantages of the present invention will be apparent from the following description of the preferred embodiment as illustrated in the accompanying drawings.

DETAILED DESCRIPTION OF THE PREFERRED EMBODIMENT

Figure 1A:
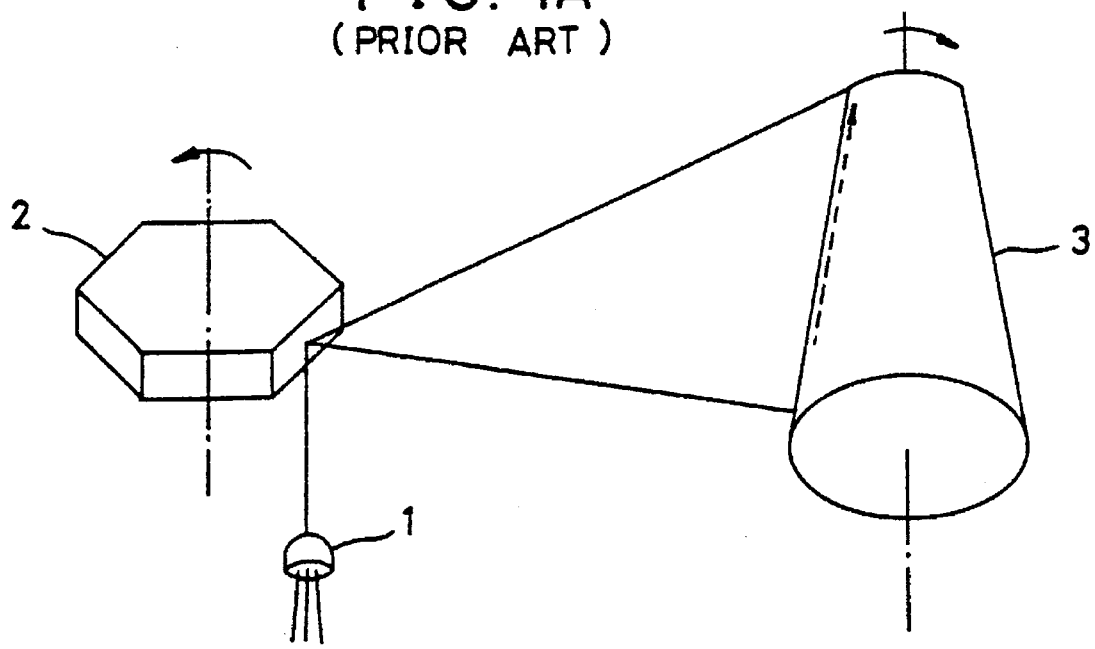
FIG. 1A shows a conceptual structure of a general LSU.
Figure 1B:
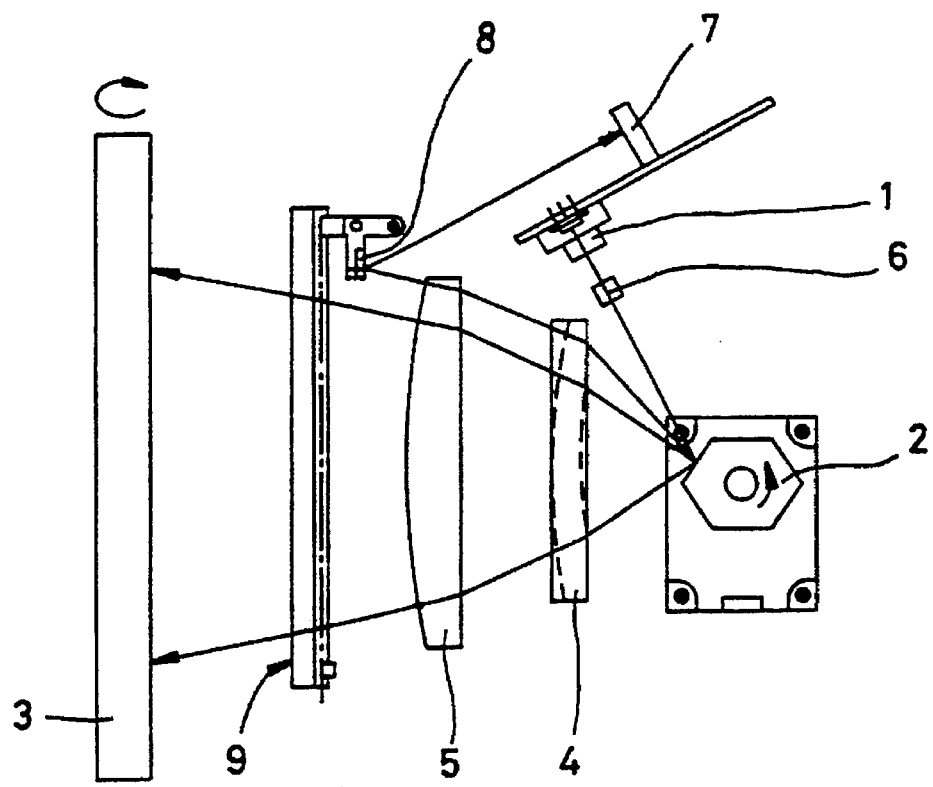
FIGS. 1B and 1C shows a practical structure of a general LSU.
Figure 1C:
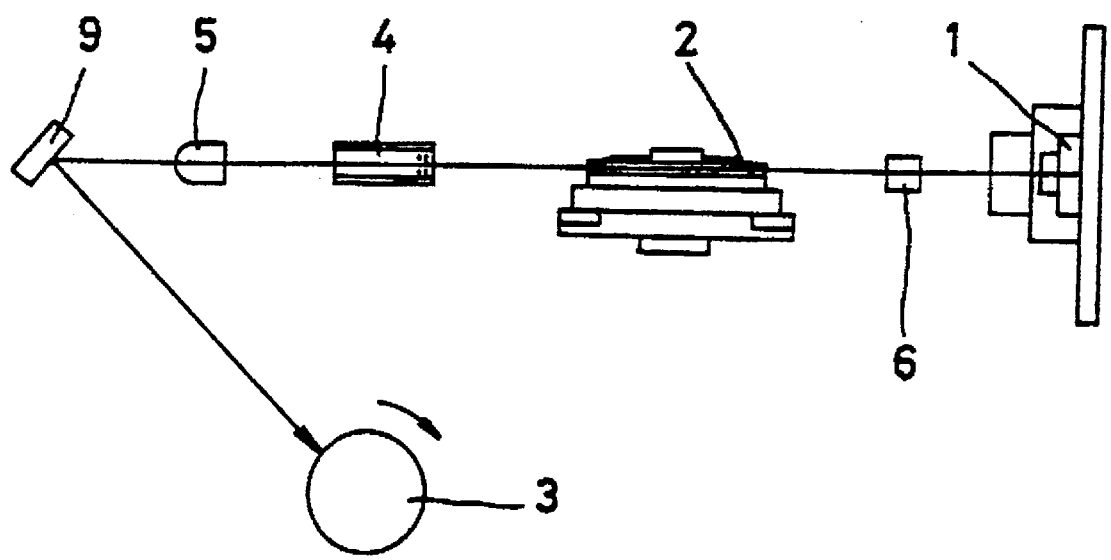
Figure 2A:
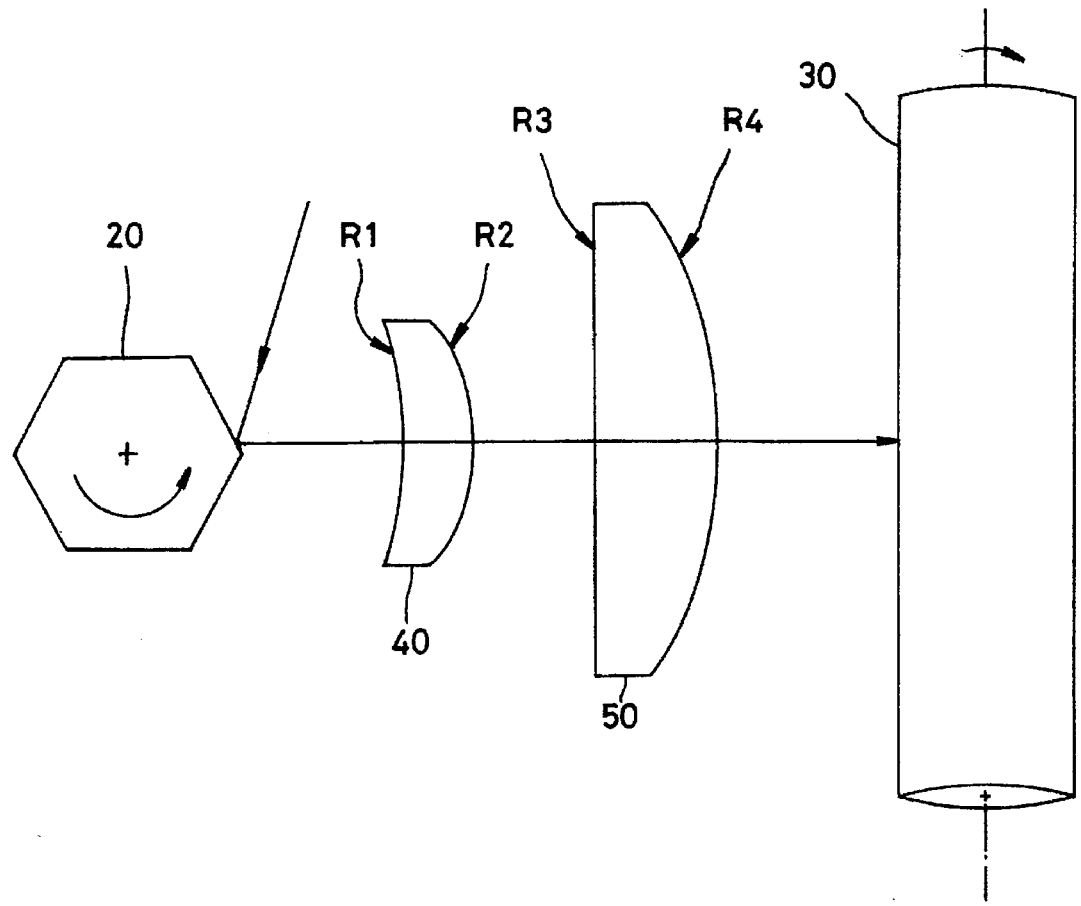
FIGS. 2A and 2B show a conceptual structure of an fθ lens system in an LSU according to the present invention, where the former is a plane view showing a main scan plane and the latter is a side view showing a cross scan profile.
Figure 2B:
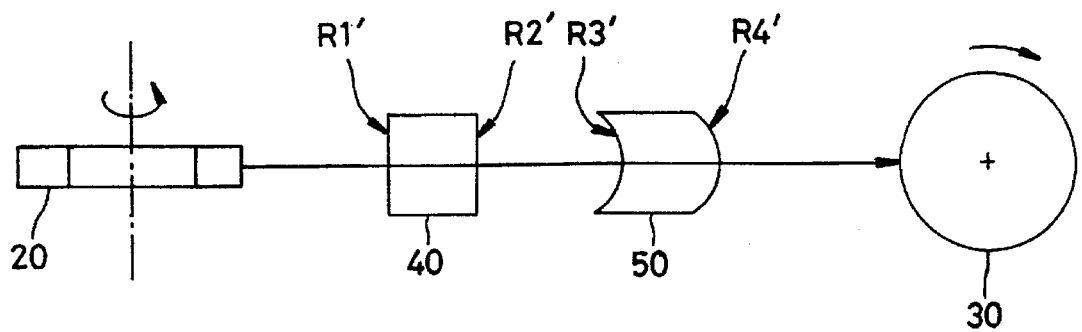

FIGS. 2A and 2B show the conceptual structure of this invention, an fθ lens system in an LSU. The structure and behaviour of this type of LSU is the same as that of the prior art LSU, except fθ lenses.

Referring to FIGS. 2A and 2B, it can be noted that a laser beam is scanned onto a photoconductive drum 30, from a laser diode 10 by way of a rotary polygon mirror 20, a first fθ lens 40, and a second fθ lens 50, sequentially. In the figures, "R1" and "R2" respectively mean the radii of curvature in the main scan direction of an incident and emergent faces of the first fθ lens 40; "R1'" and "R2'" respectively mean the radii of curvature in the cross scan direction of an incident and emergent faces of the first fθ lens 40. "R3" and "R4" respectively mean the radii of curvature in the main scan direction of an incident and emergent faces of the second fθ 50; "R3'" and "R4'" respectively mean the radii of curvature in the cross scan direction of an incident and emergent faces of the second fθ lens 50.

In this invention, the fθ lenses 40 and 50 are designed such that the refractive index of the first fθ lens 40 is lower than that of the second fθ lens 50. In particular, since infinite curvature (i.e., a flat face) was chosen for the radii of curvature R1' and R2', an ordinary cylindrical lens rather than a toric face lens can be used for the first fθ lens 40.

Specifically, since the functions of an fθ lens can be roughly divided into linearity correction and focusing correction, the first fθ lens 40 is used for the linearity correction and the second fθ lens 50 is used for the focusing correction. Since the focusing is dependent primarily on a refractive index, the first fθ lens 40 may have a lower refractive index compared with the second fθ lens 50. In addition, under the condition of a fixed focal length in a lens system, since variations in a lens focal length vs. variations in the ambient temperature are subjected to variations in a refractive index more greatly than to the linear expansion degree of a lens, the first fθ lens 40 can be made from materials having a relatively low refractive index. Therefore, although plastics have greater linear expansion degree because of its temperature-sensitive nature, they can be effectively used for the first fθ lens 40.

The following table shows empirical data for the fθ lenses of the present invention, having been realized on the basis of the above concepts.

TABLE

[Distance between fθ lenses: 31.3 ± 0.1 mm]

| | | |
|---|---|---|
| Fθ lens 1 | Main scan direction | R1 = −453.5 mm |
| | | R2 = −77.0 mm |
| | Cross scan direction | R1' = ∞ |
| | | R2' = ∞ |
| | Thickness at center | 13.35 mm |
| | | (Beam running direction) |
| | Index of refraction | 1.49176 |
| Fθ lens 2 | Main scan direction | R3 = ∞ |
| | | R4 = −188 mm |
| | Cross scan direction | R3' = −41.2 mm |
| | | R4' = −17.26 mm |
| | Thickness at center | 19.45 mm |
| | | (Beam running direction) |
| | Index of refraction | 1.51633 |

In the above table, the refractive index of the first fθ lens 40 is lower than that of the second fθ lens 50, in which the materials for the lens 40 must be chosen within the range from 1.48 to 1.60 in a refractive index, or within the range from 30 to 60 in an Abe constant. From the above table it is obvious that the first fθ lens 40 is a cylindrical lens whose radii of curvature, R1' and R2', are ∞, and that the second fθ lens 50 is a toric face lens whose radius of curvature, R3, is ∞.

Therefore, among the total four refractive faces, three faces are flat or cylindrical. That is, in the cross scan direction, both the incident face and the emergent face of the first fθ lens 40 is a flat face; the emergent face of the second fθ lens 50 is a toric face, while the incident face of the same is a cylindrical face.

In the second fθ lens 50, each of the radii of curvature in the cross scan direction of the incident and emergent faces depends on each of those in the main scan direction of the two faces (refer to FIG. 2B). For example, the radius of curvature in the cross scan direction of the emergent face, of which the radius of curvature in the main scan direction is greater than that of the incident face, is greater than that in the same direction of the opposite face, the incident face.

The radius of curvature ratios of the lenses adapted to the present invention is as follows:

$R1:R2 = 1:0.153 \sim 0.187$ $R1:R4 = 1:0.373 \sim 0.456$

Meanwhile, the focal length in a total fθ lens system adopting a glass lens and a plastic lens is given by the following general formula of $$\Delta f_b = (1-m_p)^2 \Delta f_p m_g^2,$$

where $\Delta f_b$ is the variation in the focal length from the center of a final emergent face to a scanned face, $m_p$ is the magnifying power of a plastic lens, $m_g$ is the magnifying power of a glass lens, and $\Delta f_p$ is the variation in the focal length from the center of a plastic lens emergent face to a scanned face. Therefore, a lens system can be designed with a user-defined condition, by computing optimal data satisfying the above formula.

What follows is the summary of the contents and effects of an fθ lens lens system in an LSU according to the present invention.

(1) In designing a two-lens-built-in fθ lens system, by adopting lenses whose substances differ from each other (low refractivity substance, e.g., plastic, for an fθ lens closer to a deflector; high refractivity substance, e.g., glass, for an fθ lens closer to a photoconductive drum), the gross weight of an LSU, and also the cost of production, is reduced. Since plastics is superior to glass in price and treatment, the total costs can be reduced.

(2) Only one face (i.e., the face closest to the photoconductive drum) among the total four faces of the two fθ lenses is formed into a toric face. By doing so, the usefulness of a plastic lens is increased, along with the fact in the term (1).

(3) The permissible tolerance in process can be ensured from conventional 2/100–5/100 mm to 1/10–2/10 mm, since shaping a cylindrical face is easier than a toric face.

(4) Since it is possible to choose lenses which are cheaper and can be more easily fabricated compared with conventional ones, the resolution per price or per productivity can be increased.

Although this invention has been described in detail with reference to a certain preferred version thereof, other versions are possible. For example, within the permissible range of a refractive index and an Abe constant, modifications of lens substance and toric face position is possible. Therefore, the spirit and scope of the appended claims should not be limited to the description of the preferred versions contained herein.

What is claimed is:

1. An fθ lens system in a laser scanning unit having a laser source for emitting a laser beam, a rotary deflector for deflecting said laser beam in a horizontal main scan direction, a scanned face on which said laser beam deflected from said rotary deflector is scanned, said scanned face being rotated such that said laser beam is scanned thereon in a cross scan direction perpendicular to said main scan direction, and a group of two fθ lenses, which are positioned between said rotary deflector and said scanned face, for focusing uniformly said laser beam deflected from said rotary deflector on said scanned face, wherein said group of two fθ lenses comprises a first fθ lens and a second fθ lens sequentially arranged from said deflector towards said scanned face, wherein a refractive index of said first fθ lens is lower than that of said second fθ lens, and incident and emergent faces of said first fθ lens and an incident face of said second fθ lens is shaped into a cylindrical face, and an emergent face of said second fθ lens is shaped into a toric face, wherein the radii of curvature in the cross scan direction of said incident and emergent faces of said first fθ lens are of infinite curvature, and wherein the radii of curvature in the cross scan direction of said incident and emergent faces of said second fθ lens are of negative curvature, wherein the ratio of the radius of curvature in the main direction of said incident face of said first fθ lens versus that of said emergent face of said first fθ lens satisfies the following condition, $$1:0.153 \text{ to } 0.187$$

and the ratio of the radius of curvature in the main direction of said incident face of said first fθ lens versus that of said emergent face of said second fθ lens satisfies the following condition, $$1:0.373 \text{ to } 0.456.$$

2. An fθ lens system according to claim 1, wherein an Abe constant of a material for said first fθ lens lies in the range of 30 to 60.

3. An fθ lens system according to claim 1, wherein the radii of curvature in the main scan direction of said incident and emergent faces of said first fθ lens is negative and said second fθ lens has an incident face having an infinite curvature and an emergent face having a negative curvature.

4. An fθ lens system according to claim 1, wherein the radii of curvature in the cross scan direction of said incident and emergent faces of said second fθ lens depend on the radii of curvature in the main scan direction of said incident and emergent faces of said second fθ lens.

* * * * *